(12) United States Patent
Stolk

(10) Patent No.: US 6,698,052 B2
(45) Date of Patent: Mar. 2, 2004

(54) HYDRAULICALLY ASSISTED RESTRAINT DEVICE

(75) Inventor: Christiaan Stolk, Brampton (CA)

(73) Assignee: Renum Hydraulics Ltd., Brampton (CA)

( * ) Notice: Subject to any disclaimer, the term of this patent is extended or adjusted under 35 U.S.C. 154(b) by 0 days.

(21) Appl. No.: 10/162,909

(22) Filed: Jun. 6, 2002

(65) Prior Publication Data

US 2003/0226222 A1 Dec. 11, 2003

(51) Int. Cl.[7] ................................................. E01D 1/00
(52) U.S. Cl. .......................................... 14/71.7; 14/71.3
(58) Field of Search .............................. 14/69.5, 71.1, 14/71.3, 71.5, 71.7

(56) References Cited

U.S. PATENT DOCUMENTS

| | | | |
|---|---|---|---|
| 4,110,860 A | 9/1978 | Neff et al. | |
| 4,365,374 A | 12/1982 | Bennett | |
| 4,823,421 A | * 4/1989 | Kleynjans et al. | ............ 14/71.3 |
| 4,827,549 A | 5/1989 | Walker | |
| 4,977,635 A | * 12/1990 | Alexander | .................. 14/71.3 |
| 5,313,681 A | 5/1994 | Alexander | |
| 5,511,267 A | 4/1996 | Alexander | |
| 5,526,545 A | 6/1996 | Alexander | |
| 5,544,381 A | * 8/1996 | Alexander | .................. 14/71.7 |
| 5,586,355 A | 12/1996 | Metz et al. | |
| 5,832,554 A | 11/1998 | Alexander | |
| 6,085,375 A | 7/2000 | Holm | |
| 6,163,913 A | 12/2000 | DiSieno et al. | |
| 6,327,733 B1 | 12/2001 | Alexander et al. | |
| 6,488,464 B1 | * 12/2002 | Kish | .......................... 414/401 |
| 2002/0168255 A1 | * 11/2002 | Kish | .......................... 414/401 |

OTHER PUBLICATIONS

Multi–Fab Products, LLC BMF 4007 Rewind Weel Style Holdown.
Multi–Fab Products, LLC DLMF 8000 Completed Assembly.

* cited by examiner

Primary Examiner—Thomas B. Will
Assistant Examiner—Alexandra K. Pechhold
(74) Attorney, Agent, or Firm—Eugene J. A. Gierczak

(57) ABSTRACT

A device for restraining the upward movement of a dock comprising a hydraulic cylinder having a fixed end; a piston slideably disposed in the cylinder so as to define opposed first and second chambers; a rod having one end connected to the slideable piston, extending through the first chamber and having another end adapted for connection to the dock; hydraulic reservoir containing hydraulic fluid communicating with the first chamber; valve means disposed between the reservoir and the first chamber, the valve means having open position permitting the hydraulic fluid to flow from the first chamber to the reservoir and extending the rod in response to the upward movement of dock; a closed position stopping the flow of the hydraulic fluid from the first chamber to the reservoir and restraining the upward movement of the dock.

12 Claims, 5 Drawing Sheets

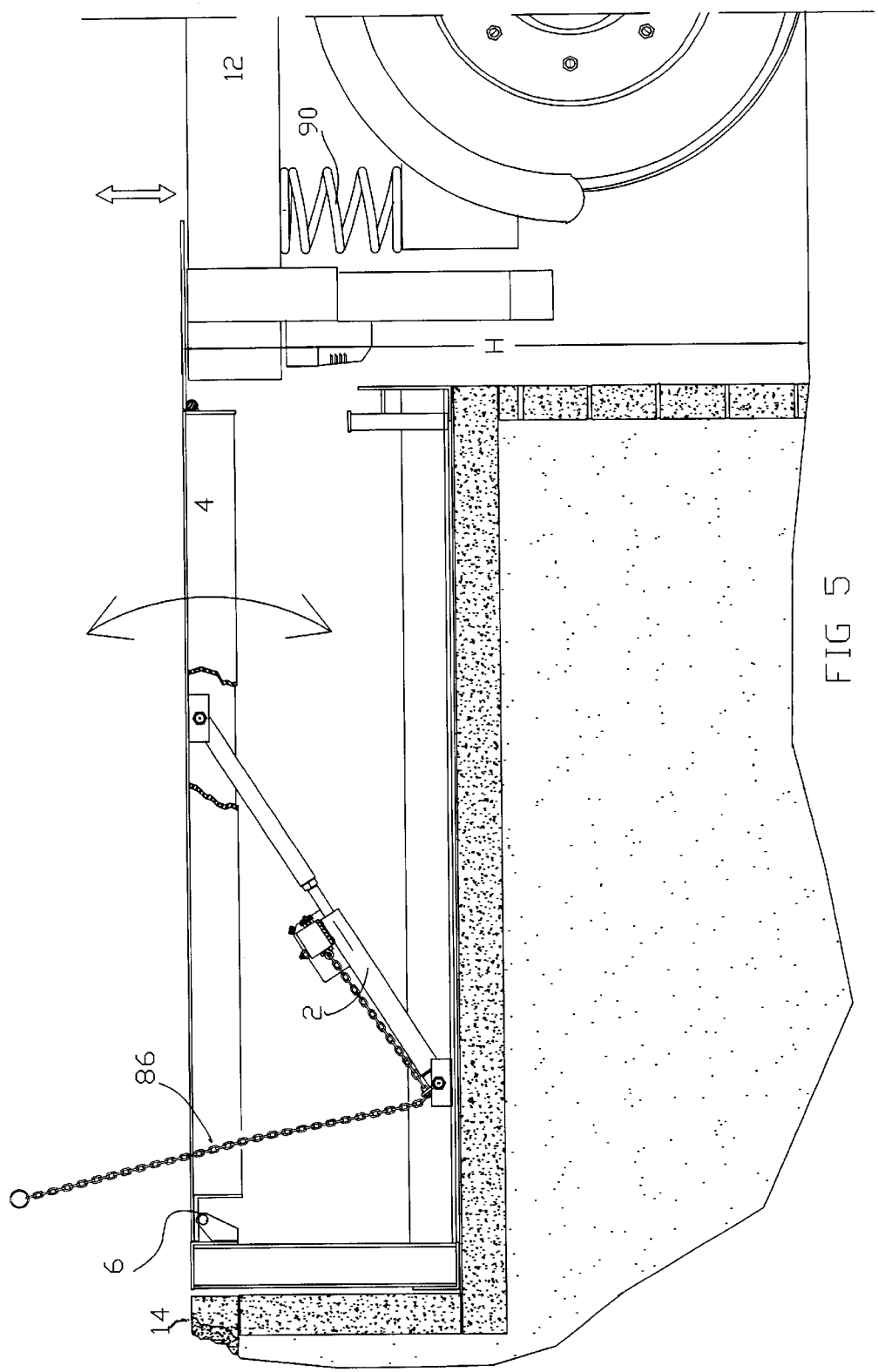

HYDRAULICALLY ASSISTED RESTRAINT DEVICE

FIELD OF INVENTION

This invention relates to a device for restraining the upward movement of a dock and particularly relates to a hydraulically assisted restraint device. This invention also relates to an assembly for holding a dock relative a vehicle as well as a method of holding down a spring loaded dock having a pivotal end and a moveable distal end.

BACKGROUND ART

Dock levellers generally comprise hinged ramp structures which are disposed in vehicle loading docks to provide a ramp extending between a vehicle load bed and the loading dock to facilitate movement of cargo between the dock and the vehicle and to overcome any difference in elevation between the floor of the vehicle load bed and the dock.

Various structures and devices have heretofore been manufactured and sold some of which include extension lip members. Each of the devices and assemblies in the prior art are subjected to the change in height of the vehicle load bed relative the dock during loading and unloading operations.

Generally speaking the dock has a hinged or pivotal end and a moveable distal end which can move vertically relative to the vehicle's load bed. Accordingly as the loaded vehicle is backed up towards the dock the distal end is adjusted so as to rest generally at the edge of the load bed of the vehicle. The suspension system of a vehicle is generally compressed due to the weight of the cargo when initially adjusting the dock relative to the load bed. Upon unloading of the cargo, whether by pallet truck or otherwise the weight of the cargo diminishes and the potential energy of the suspension system in the vehicle increases since the weight of the cargo is no longer there to balance the force in the suspension system which generally includes springs. Accordingly such dock levelling devices and apparatus are subject to rapid wear and unwanted damage as a result of this type of movement.

Various devices have heretofore been devised. For example, U.S. Pat. No. 6,327,733 B1 relates to a pit type dock leveller having a frame adapted to be fixedly mounted at a dock with a deck, pivotally mounted to the frame at one end thereof, and having a pivotal lip at the other end. A spring is mounted to the deck and the frame to support and raise the deck. A hydraulic actuator is coupled to the deck and to a pivotal link member that is mounted to the frame. In a powered mode, the hydraulic unit acts as a power assist for the springs to move the deck from a generally horizontal stored position to an operative position. Such device positions the dock by use of an electric hydraulic power utilizing the hydraulic cylinder to move the dock up.

Moreover U.S. Pat. No. 6,163,913 discloses a dock leveller including a pivotal mounted ramp and a lip member pivotally mounted to the distal end of the ramp and moveable between an extended position and a depending position for forming a path between a loading dock and a load bed of a vehicle. A motor operated linear power screw type actuator is connected to the ramp for moving the ramp to an elevated position and includes an extension member which is engageable with a second tube and telescope relationship in such a way that the actuator tube may be controlled after positioning the ramp to engage the load bed of a vehicle so that the actuator is not subject to forces exerted by the ramp during oscillatory movement while the vehicle is being loaded or unloaded. This device generally describes a hydraulic cylinder used to hold up the dock and protect the dock from sudden downward movements.

Moreover U.S. Pat. No. 5,832,554 relates to a dock leveller typically powered by electric actuator or other motive source having a frame and a deck pivotally mounted to the frame.

Furthermore U.S. Pat. No. 5,856,355 relates to a safety device for a vertically stored dock leveller. Electric power is required to allow the dock leveller to be lowered and the dock leveller will stop if electrical power to the control circuit is interrupted.

Furthermore U.S. Pat. No. 5,526,545 also relates to a dock moveable by hydraulic cylinder which mechanism returns a loading dock into a stored position automatically.

These and other devices illustrate the use of devices which hold up docks. There have also been mechanical devices such as wheel style pulley systems which hold docks downwardly as well as mechanical rachet type hold down systems, which can come apart if subjected to increased upward pressure due to unloading of a vehicle.

It is an object of this invention to provide an improved hydraulic hold down system.

It is an object of this invention to provide an improved device for restraining the upward movement of a dock and particularly an assembly for holding a dock relative a vehicle.

DISCLOSURE OF INVENTION

It is an aspect of this invention to provide a device for restraining the upward movement of a dock comprising a hydraulic cylinder having a fixed end; a piston slideably disposed in said cylinder so as to define opposed first and second chambers; a rod having one end connected to said slideable piston, extending through said first chamber and having another end adapted for connection to said dock; hydraulic reservoir containing hydraulic fluid communicating with said first chamber; valve means disposed between said reservoir and said first chamber, said valve means having open position permitting said hydraulic fluid to flow from said first chamber to said reservoir and extending said rod in response to said upward movement of said dock; a closed position stopping the flow of said hydraulic fluid from said first chamber to said reservoir and restraining the upward movement of said dock.

It is a further aspect of this invention to provide an assembly for holding a dock relative a vehicle comprising a dock having one end moveable relative said vehicle; means for urging said one end of said dock upwardly relative said vehicle; a hydraulic cylinder having a fixed end relative said dock; a piston slideably disposed in said cylinder so as to define opposed first and second chambers; a rod having one end connected to said slideable piston extending through said first chamber and having another end connected to said moveable dock; hydraulic reservoir containing hydraulic fluid communicating with said first chamber; valve means disposed between said reservoir and said first chamber having an open position permitting said hydraulic fluid to flow from said first chamber to said reservoir so as to extend said rod in response to said upward movement of said dock; a closed position stopping the flow of said hydraulic fluid from said first chamber to said reservoir and restraining said urging means from urging said upward movement of said one end of said dock; means for moving said valve means between said open and closed positions.

It is yet another aspect of this invention to provide a method of holding down a spring loaded dock having a pivotable end and a distal end with a hydraulic cylinder having a valve and a piston slideably disposed in said cylinder so as to define opposed first and second chambers, and a rod having one end connected to said piston, said rod extending through said first chamber and having another end extending outwardly of said first cylinder and connected to said dock comprising the steps of fixing one end of said cylinder relative said dock; connecting said another end of said rod to said dock; opening said valve so as to extend said rod as said spring loaded dock rises; closing said valve to lock said rod in said position and hold said spring loaded dock.

BRIEF DESCRIPTION OF DRAWINGS

FIG. 5 is another side elevational view of the invention.

BEST MODE FOR CARRYING OUT THE INVENTION

Figure 1:
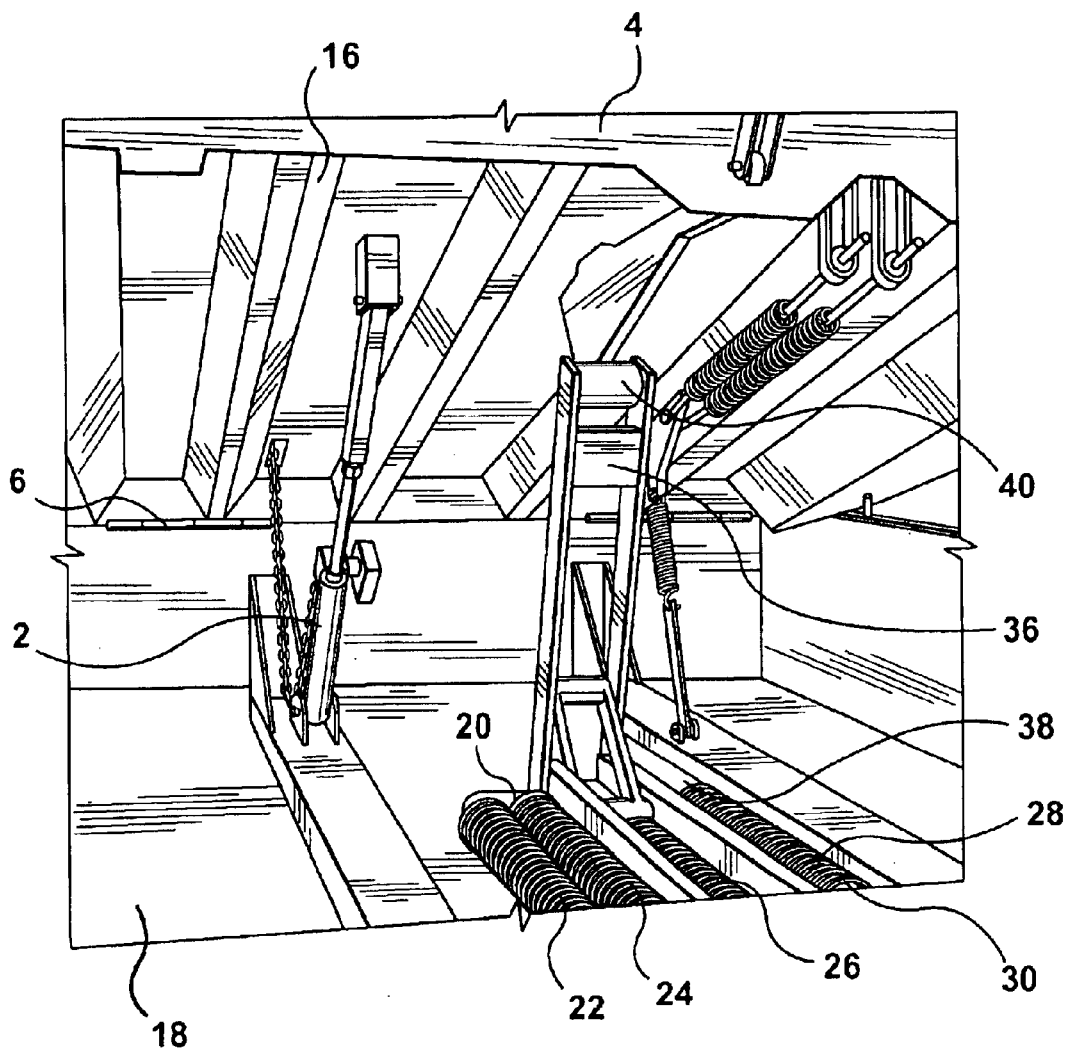
FIG. 1 is a perspective view of the assembly for holding a dock relative a vehicle.

In the description that follows, like parts are marked throughout the specification and the drawings with the same respective reference numerals. The drawings are not necessarily to scale and in some instances proportions may have been exaggerated in order to more clearly depict certain features of the invention.

Figure 2:
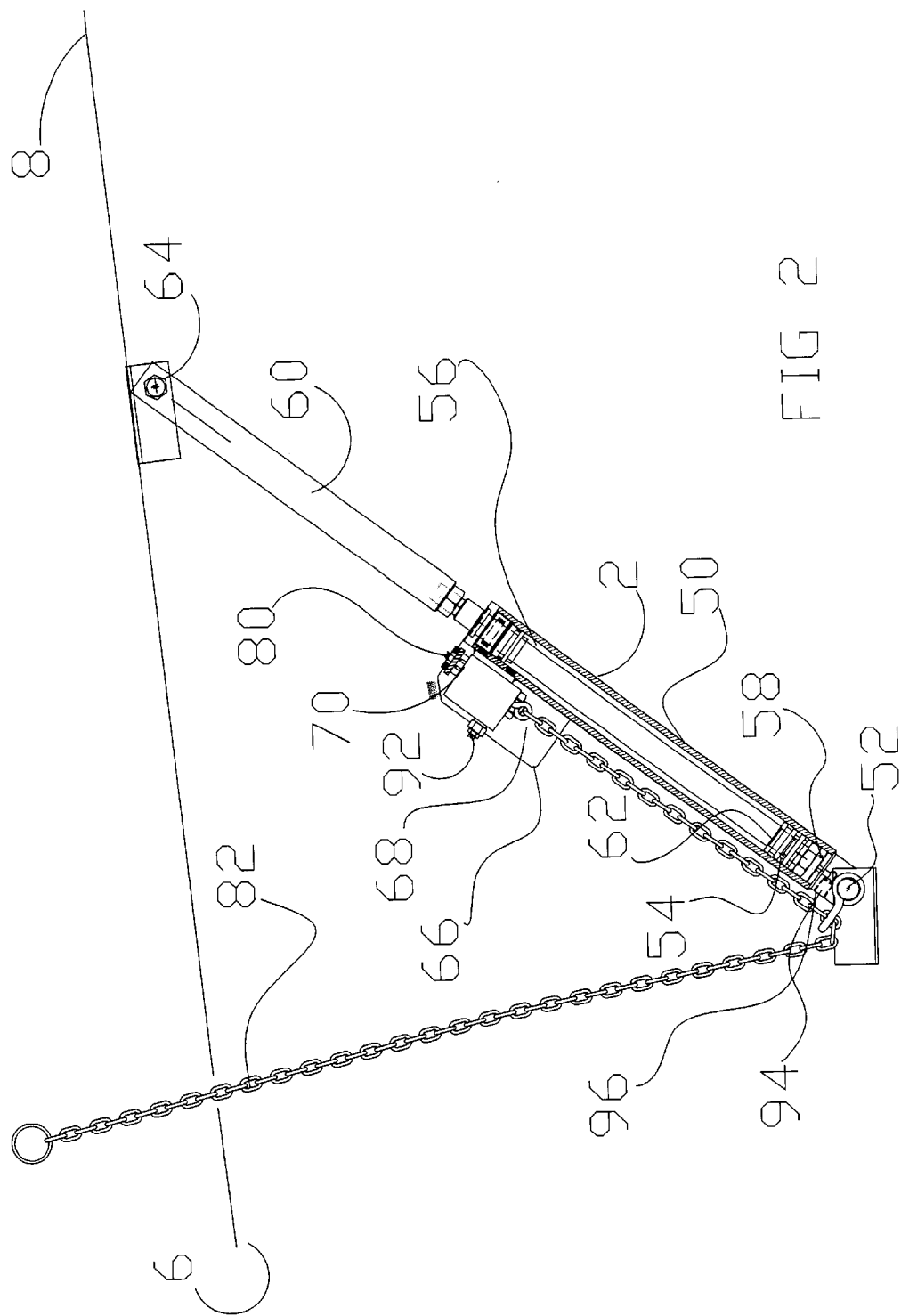
FIG. 2 is a full cross-sectional view through the hydraulic cylinder.
Figure 3:
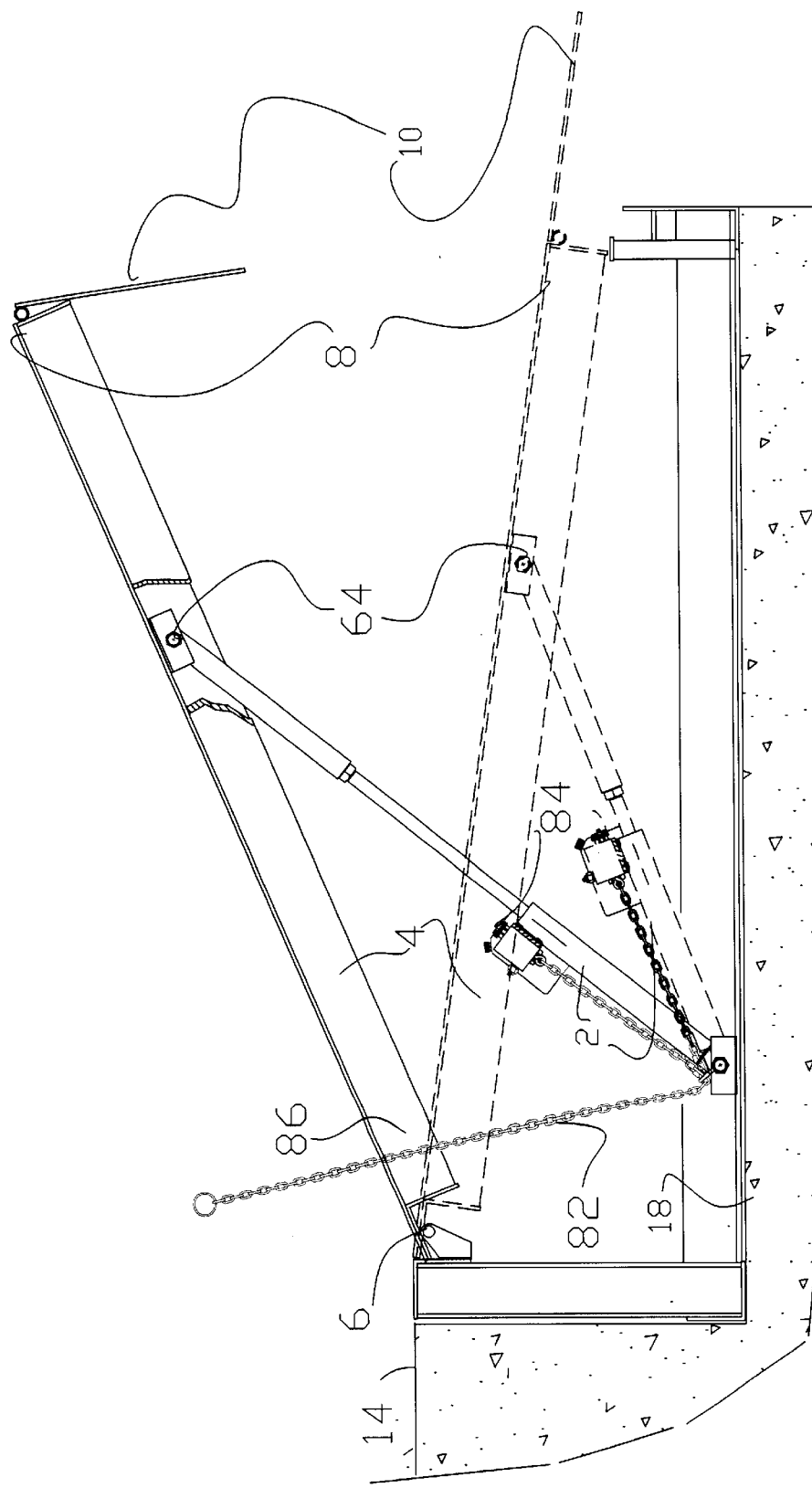
FIG. 3 is a side elevational view showing the hydraulic cylinder in a closed position and an open position.
Figure 4:
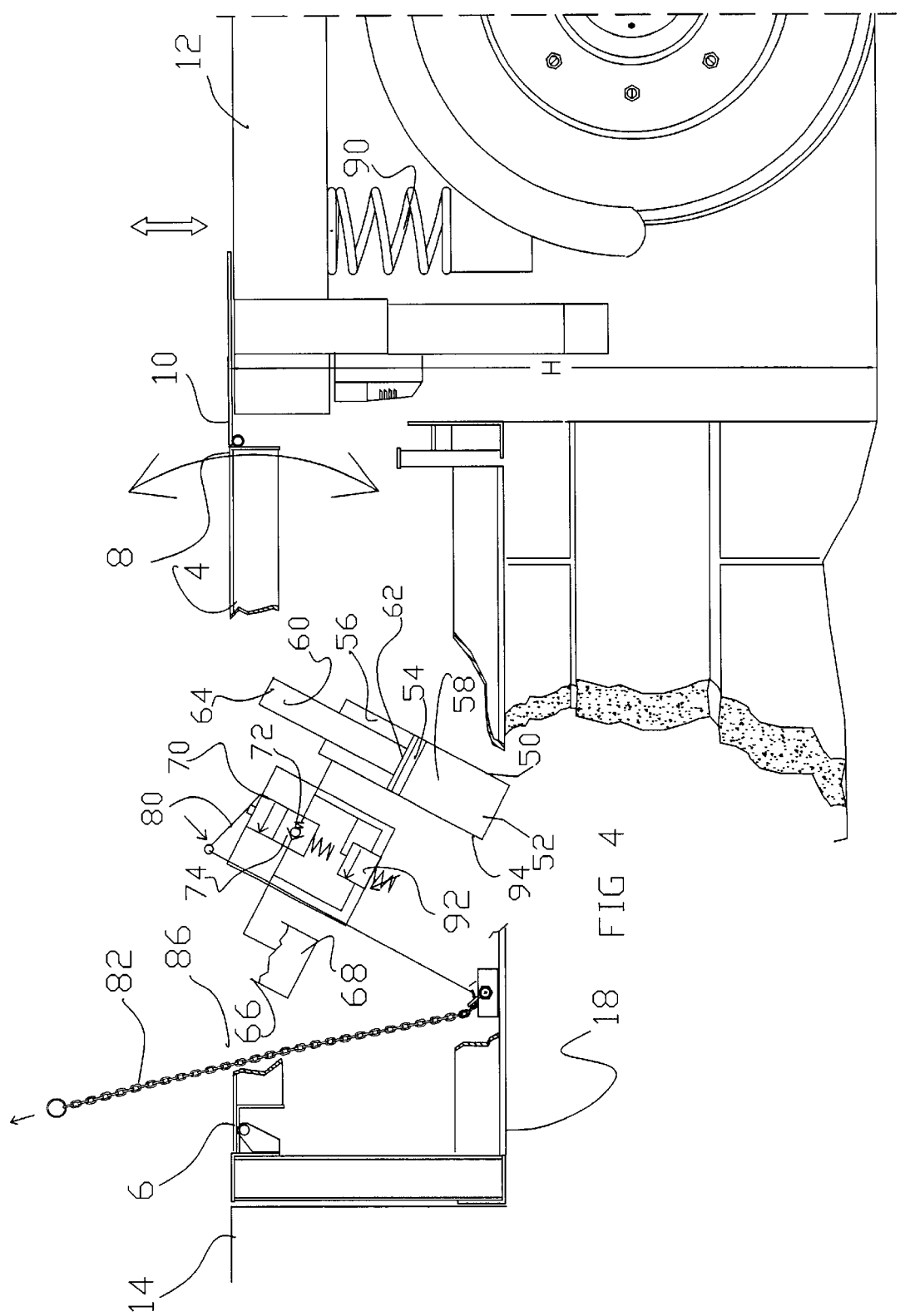
FIG. 4 is a schematic diagram of the hydraulic cylinder.

FIGS. 1 and 2 illustrate the device 2 for restraining the upward movement of a dock 4. The dock 4 is generally comprised of a hinged or pivotal end 6 and a distal end 8 which may include an extendable lip 10 which is well known to those persons skilled in the art. The distal end 8 is adapted to be moved vertically upwardly or downwardly relative to a vehicle 12 as shown in FIGS. 3 and 4. The distal end 8 is adapted to be moved vertically up or down in a manner to be described herein so as to level the height H of the vehicle 12 relative to the height h of a loading platform 14.

The dock 4 may include a frame 16 and may pivot about the pivotable end 6 above a pit 18 which pit 18 may include the various mechanisms for movement of the dock to be described herein.

Generally speaking the dock 4 is urged upwardly by means of structure which causes the dock to be moved upwardly. As shown in FIG. 1, such upwardly moving means may comprise of spring loaded means 20 having a plurality of springs 22, 24, 26 and 28. One end 30 of each of the springs 22, 24, 26 and 28 are fixed or anchored to the pit 18 and the other end 32 of each of the springs 22, 24, 26 and 28 are connected to one end of an arm assembly 34 so as to cause the arm 36 to rotate about pivot 38 and thereby urge the dock upwardly. A roller 40 is generally utilized in order to reduce friction.

Any spring biasing means or upwardly moveable dock means may be utilized and the invention should not be limited to the spring loaded means shown in FIG. 1.

Accordingly the dock is biased in an upward position by means of the spring loaded means 20.

A device 2 is utilized to restrain the upward movement of the dock. Generally speaking the device comprises a hydraulic cylinder 50 having a fixed end 52 and a piston 54 slideably disposed in the cylinder so as to define opposed first chamber 56 and second chamber 58. A rod 60 has one end 62 connected to the slideable piston 54 and extends through the first chamber 56 and has another end 64 connected to the dock 4. A hydraulic reservoir 66 contains hydraulic fluid 68 for communicating with the first chamber 56. In other words, the first chamber 56 is filled with hydraulic fluid. Any suitable hydraulic fluid can be utilized, one example of which includes hydraulic aircraft fluid.

A valve means 70 is disposed between the reservoir 66 and the first chamber 56.

FIG. 4 illustrates one example of the valve means 70 which comprises a ball 72, a seat 74. The valve means 70 as shown in FIG. 4 generally comprises a check valve which is biased in a closed or blocked position. The closed or blocked position corresponds to the ball 72 bearing against the seat 74. Hydraulic fluid 68 can not communicate with the reservoir 66 in the closed position since the ball 72 bears against the seat 74. However, the ball 72 may be separated from the seat 74 by utilizing separating means 80 which in the figures comprise a pull chain 82. The pull chain 82 is connected at one end 84 to an assembly which will separate the ball 72 from the seat 74 thereby permitting communication of the hydraulic fluid 68 from the first chamber 56 to the reservoir 66. Upon moving the valve means 70 to an open or unblocked position the upward movement of the spring means 20 will cause the deck 4 to move upwardly or pivot about the pivot end 6 thereby extending the rod 60 since the end of the rod 64 is connected to the deck 4.

The pull chain 82 extends through an appropriate aperture 86 located in the deck 4. Accordingly a user may pull on the pull chain 86 thereby releasing the locking device of the hydraulic cylinder 2 and therefore the springs 22 move the deck upwardly relative a vehicle. As the deck 4 moves upwardly by means of the spring means 20 the rod 60 is extended whereby the volume of the first chamber 56 diminishes while the volume of the second chamber 58 enlarges. Upon releasing the check valve 86 the valve means 70 closes stopping further communication of hydraulic fluid 68 from the first chamber 56 to the reservoir 68. Accordingly the position of the deck 4 is "locked" and the hydraulic device 2 restrains further upward movement of the dock 4.

The spring-loaded means 20 is selected to lift the dock 4 when the chain is released. Therefore once a user pulls the pull chain 80 the check valve 70 opens permitting hydraulic fluid 68 to move from the first cylinder 56 back into the reservoir 68 extending the rod 60 as the distal end 8 of the dock moves upwardly.

Thereafter a vehicle may be backed up against the dock 4 in which event the distal end 8 would be higher than the height H of the vehicle 12. Thereafter a person may walk along the dock causing the distal end 8 to move downwardly due to the weight of the person until the height is substantially the same as the height H of the vehicle. The rod 60 in such event would be forced downwardly opening the check valve 70 causing hydraulic fluid to flow from the reservoir 66 back into the first chamber 56 thereby slightly expanding the volume of the first chamber 56. Once the hydraulic cylinder 2 adjusts to the height of the vehicle 12 a tow motor may be used to unload the load from the vehicle unto the ramp 4 and platform 14.

As the vehicle is unloaded the springs 90 of the vehicle would expand thereby creating an upward force on the distal end 8 of the dock 4.

The hydraulic cylinder 2 is also equipped with a bypass valve 92 as shown in FIG. 2 which would automatically open at a preselected position when the force from the spring 90 reaches a selected value. Without the bypass valve 92 it is possible that the end of the vehicle 12 may exert such a force at the distal end 8 to excessively wear out the dock mechanism.

The bypass valve 92 may be selected at a certain pressure such as for example 2000 pounds in which event hydraulic fluid 68 in the first chamber 56 would flow back into the reservoir 66 automatically extending rod 60 upwardly as well as the dock 4 to relieve the pressure at the distal end 8 created by the expansion of the vehicle's springs 90.

FIG. 3 shows the device 2 and dock 4 in a down position (hidden lines) 15 as well as showing an extended or highest position where the chain has been pulled. FIG. 4 shows the dock 4 in a working or loading position, which may be in a horizontal position, but need not be.

The second chamber 52 includes a vent hole 94 which vents to the atmosphere.

Alternatively the valve means can comprise an electric operated lock valve for opening and closing the communication of the hydraulic fluid 68 between the reservoir 66 and the first chamber 56 electrically. In one example the electric operated lock valve may comprise a solenoid valve.

The assembly as shown in FIG. 1 holds the dock 4 relative the vehicle 12 and comprises:
(a) a dock 4 having one end 8 moveable relative the vehicle 12;
(b) means 20 for urging one end 8 of the dock 4 upwardly relative the vehicle 12;
(c) hydraulic cylinder 50 having:
    (i) a fixed end 52 relative dock 4;
    (ii) a piston 54 slideably disposed in the cylinder 50 so as to define opposed first and second chambers 56 and 58 respectively;
    (iii) a rod 60 having one end 62 connected to the slideable piston 54 extending through the first chamber 56 and having another end 64 connected to the moveable dock 4;
(d) a hydraulic reservoir 66 containing hydraulic fluid 68 communicating with the first chamber 56;
(e) a valve means 70 disposed between the reservoir 66 and the first chamber 56 having:
    (i) an open position permitting the hydraulic fluid 68 to flow from the first chamber 56 to the reservoir 66 so as to extend the rod 60 in response to the upward movement of the dock 4;
    (ii) a closed position stopping the flow of the hydraulic fluid 68 from the first chamber 56 to the reservoir 66 and restrain the urging means 20 from urging the upward movement of one end 8 of the dock 4;
(f) means 80 for moving the valve means 70 between the open and closed positions.

Accordingly the device 2 and the assembly as shown in FIG. 1 discloses a method of holding down a spring loaded dock 4 comprising the steps of:
(a) fixing one end 52 of the cylinder 50 relative the dock 4;
(b) connecting the other end 64 of the rod to the dock 4;
(c) opening the valve 70 so as to extend the rod 60 as the spring loaded dock 4 rises
(d) closing the valve 70 to lock the rod 60 in said position and hold said spring loaded dock 4.

Various embodiments of the invention have now been described in detail. Since changes in and/or additions to the above-described best mode may be made without departing from the nature, spirit or scope of the invention, the invention is not to be limited to said details.

I claim:
1. A device for restraining the upward movement of a dock comprising:
    (a) hydraulic cylinder having:
        (i) a fixed end;
        (ii) a piston slideably disposed in said cylinder so as to define opposed first and second chambers;
        (iii) a rod having one end connected to said slideable piston, extending through said first chamber and having another end adapted for connection to said dock;
    (b) hydraulic reservoir containing hydraulic fluid communicating with said first chamber;
    (c) valve means disposed between said reservoir and said first chamber, said valve means having:
        (i) open position permitting said hydraulic fluid to flow from said first chamber to said reservoir and extending said rod in response to said upward movement of said dock;
        (ii) a closed position stopping the flow of said hydraulic fluid from said first chamber to said reservoir and restraining the upward movement of said dock;
    (d) said second chamber including a hole to vent to the atmosphere.

2. A device as claimed in claim 1 wherein said valve means comprises a check valve.

3. A device as claimed in claim 2 wherein said valve means further includes bypass means for permitting hydraulic fluid to flow from said first chamber to said reservoir when said hydraulic fluid reaches a preselected fluid pressure so as to extend said rod.

4. A device as claimed in claim 1 wherein said valve means comprises an electric operated lock valve for opening and closing the communication of said hydraulic fluid between said reservoir and said first chamber electrically.

5. A device as claimed in claim 4 wherein said electric operated lock valve comprises a solenoid valve.

6. A device as claimed in claim 1 wherein said valve means includes a bypass valve.

7. A device as claimed in claim 6 wherein said bypass valve is adapted to open at a pre-selected force.

8. A device for restraining the upward movement of a dock comprising:
    (a) hydraulic cylinder having:
        (i) a fixed end;
        (ii) a piston slideably disposed in said cylinder so as to define opposed first and second chambers;
        (iii) a rod having one end connected to said slideable piston, extending through said first chamber and having another end adapted for connection to said dock;
    (b) hydraulic reservoir containing hydraulic fluid communicating with said first chamber;
    (c) a check valve disposed between said reservoir and said first chamber said valve means having:
        (i) open position permitting said hydraulic fluid to flow from said first chamber to said reservoir and extending said sod in response to said upward movement of said dock;
        (ii) a closed position stopping the flow of said hydraulic fluid from said first chamber to said reservoir and restraining the upward movement of said dock;
    (d) said second chamber including a hole to vent to the atmosphere
wherein said check valve includes:
    (a) a seat;
    (b) a ball adapted to bear against said seat;

(c) spring means for urging said ball and seat together in said closed position.

9. A device as claimed in claim 8 including means associated with said check valve means for separating said ball from said seat in said open position.

10. A device as claimed in claim 9 wherein said separating means comprises a pull chain associated with said check valve.

11. A device as claimed in claim 10 wherein said spring is biased to urge said ball and valve together in said closed position.

12. A device for restraining the upward movement of a dock comprising:
   (a) a hydraulic cylinder having:
      (i) a fixed end;
      (ii) a piston slideably disposed in said cylinder so as to define opposed first and second chambers:
      (iii) a rod having one end connected to said slideable piston, extending through said first chamber and having another end adopted for connection to said dock;
   (b) hydraulic reservoir containing hydraulic fluid communicating only with said first chamber;
   (c) valve means disposed between said reservoir and said first chamber, said valve means having:
      (i) an open position permitting said hydraulic fluid to flow from said first chamber to said reservoir and extending said rod in response to said upward movement of said dock;
      (ii) a closed position stopping the flow of said hydraulic fluid from said first chamber to said reservoir and restraining the upward movement of said dock;
   (d) said second chamber including a hole to vent to the atmosphere wherein said valve means comprises an electric operated lock valve for opening and closing the communication of hydraulic fluid between said reservoir and sad first chamber.

* * * * *